March 25, 1947.  W. B. OSBORNE  2,417,944
SPEED VARYING GEARING
Filed Aug. 16, 1944  2 Sheets-Sheet 1
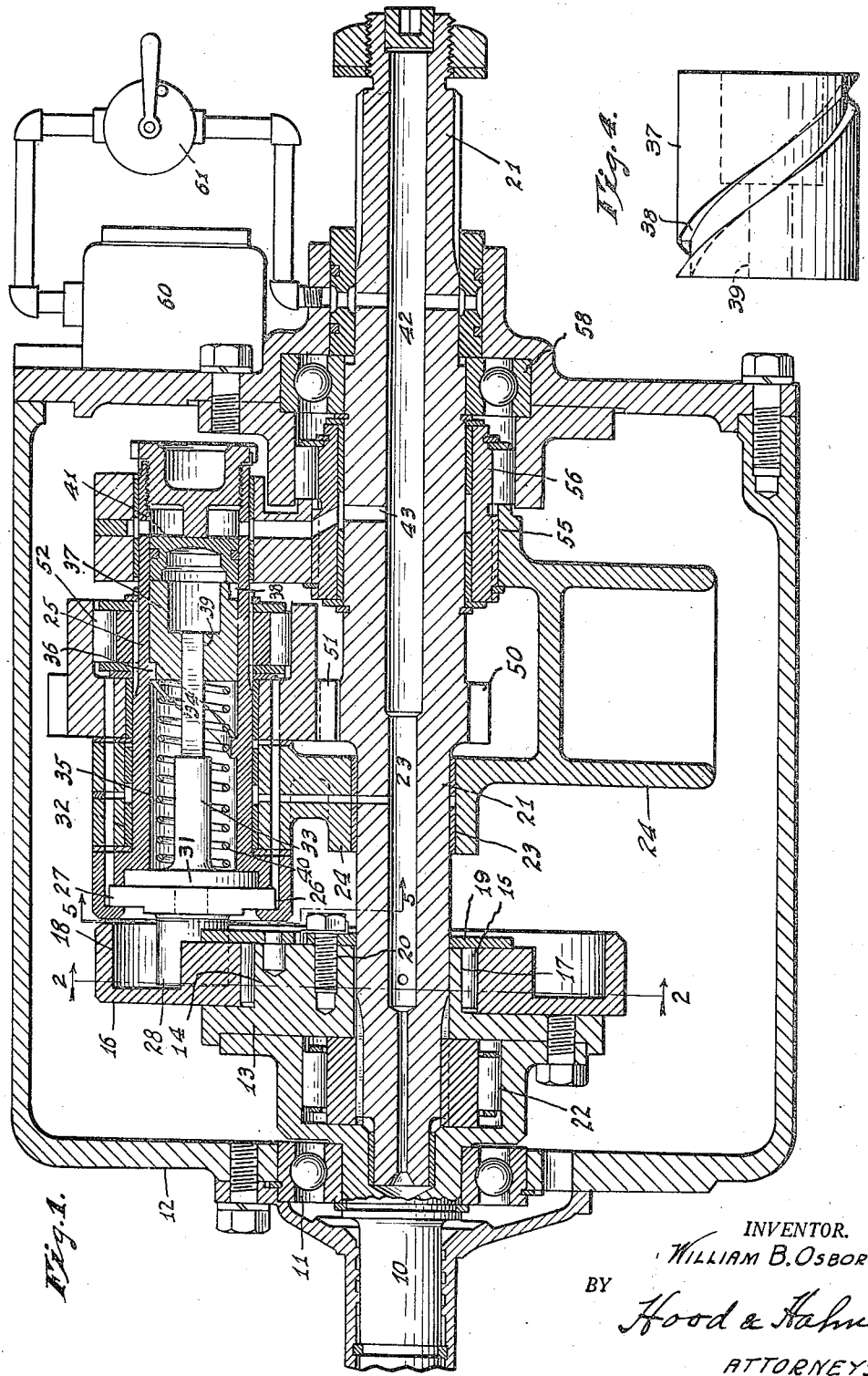
INVENTOR.
WILLIAM B. OSBORNE,
BY
Hood & Hahn
ATTORNEYS.

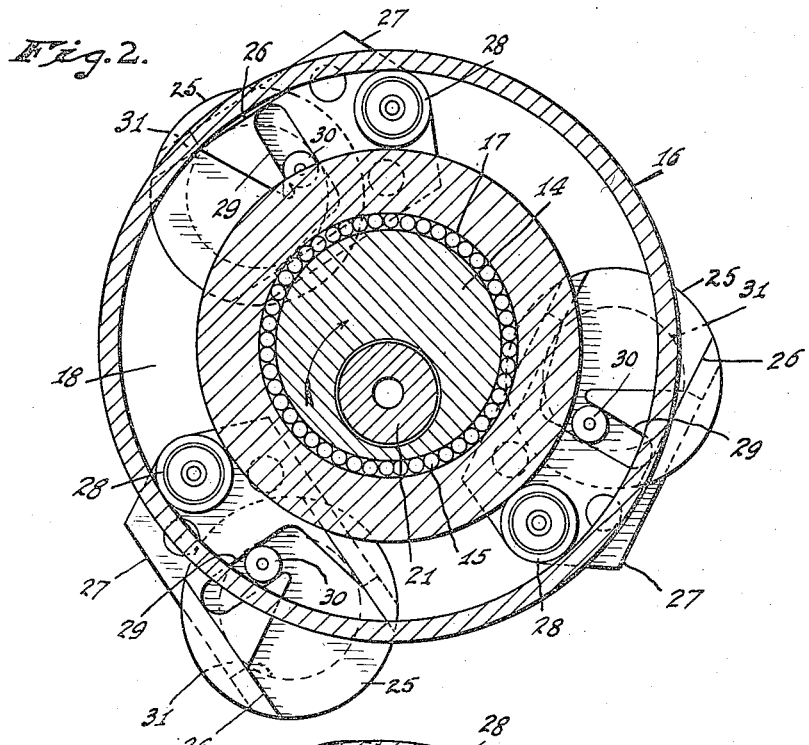
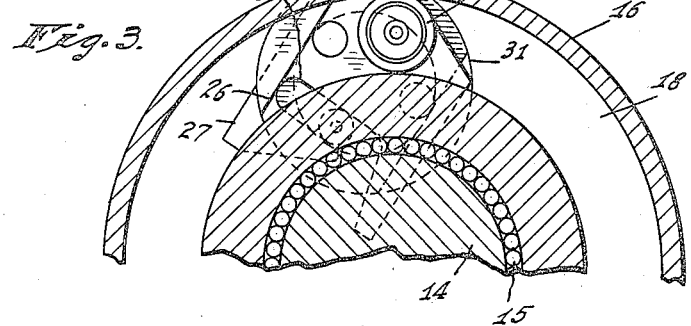
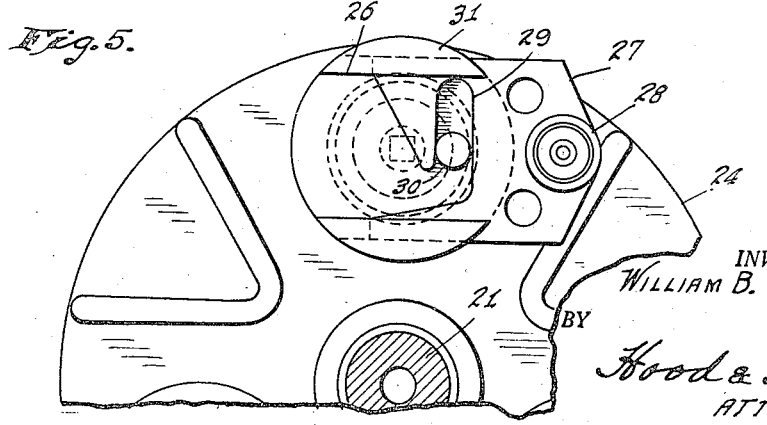

Patented Mar. 25, 1947

2,417,944

UNITED STATES PATENT OFFICE 2,417,944

SPEED VARYING GEARING

William B. Osborne, Muncie, Ind.

Application August 16, 1944, Serial No. 549,754

3 Claims. (Cl. 74—115)

The object of my invention is to provide a variable speed transmission unit characterized by variable-lever ratchet mechanism.

The accompanying drawings illustrate my invention.

Fig. 1 is an axial section;

Fig. 2 is a transverse section on line 2—2 of Fig. 1 with the parts in low speed relation;

Fig. 3 is a fragmentary view similar to Fig. 2 with the parts in high speed position;

Fig. 4 is a view of the leverage-control plunger; and

Fig. 5 is a section on line 5—5 of Fig. 1.

In the drawings 10 indicates an input shaft supported by bearing 11 in housing 12. Shaft 10 carries a disc 13 provided with an eccentric 14, the axis of which is offset relative to the axis of shaft 10. Journalled by bearings 15 on eccentric 14 is a wobble ring 16, the bore 17 of which is concentric with an annular groove 18. Wobble ring 16 and the lower bearings 15 are held axially in place by a retaining ring 19 secured to disc 13 by set screws 20.

The output shaft 21 is aligned with input shaft 10 and its inner end is journalled in the adjacent end of shaft 10. Interposed between shafts 10 and 21 is a one-way clutch 22 which prevents overrunning of shaft 21 relative to shaft 10. If free wheeling of the output shaft relative to the input shaft is desired, this overrunning clutch 22 may be omitted.

Journalled on shaft 21 at 23 is a planet carrier 24 in which is journalled, parallel with the axis of shaft 21, three lever sleeves spaced circumferentially around the axis of shaft 21. Each of these lever sleeves, at its end adjacent wobble ring 16, is provided with a transverse slideway 26 which is radial relative to the axis of the sleeve, and slidably mounted in this guideway is the lever arm 27 provided at its outer end with a roller or pin 28 which projects into groove 18 of the wobble ring 16 and the axis of which is parallel with the axes of the lever sleeves and shaft 21. Slide 27 is provided with a cross head slot 29 into which projects a pin 30 carried by the rotatable head 31 journalled in seat 32 in the lever sleeve 25. Integral with head 31 is an axial pin 33, the free end 34 of which is polygonal in cross section and symmetrical with the axis of head 31. A midportion of the bore 35 of sleeve 25 is rifled, as indicated at 36, and associated with this rifled portion is an axially sliding plunger 37, the exterior of which is rifled, at 38, to mate with the rifled portion 36, the pitch of said rifling being such that the limited axial movement of plunger 37 will produce an angular movement of head 31 of 180 degrees. Plunger 37 is provided with a polygonal bore 39 which receives the polygonal portion 34 of pin 33. A spring 40, interposed between head 31 and plunger 37 normally urges said plunger to the right (Fig. 1), thereby positioning pin 30 relative to the cross head slot 29 so as to move roller 28 to its farthest position relative to the axis of lever sleeve 25, as shown in Fig. 2. Slidably mounted in the right hand end of the bore of each lever sleeve 25 is a piston 41 which engages plunger 37. Leading from an axial passage 42 in shaft 21 to the bore of each sleeve 25 beyond the free end of each piston 41 is a passage 43.

Shaft 21 carries a pinion 50 which is meshed by the three gears 51, one being journalled upon each of the lever sleeves 25 and connected therewith by means of a one-way clutch 52 which permits the gear 51 to rotate its sleeve 25 in the forward direction only.

The planet carrier 24, at the right hand end Fig. 1, is bored at 55 so as to clear pinion 50 and splined in this bore is a bearing sleeve 56 between which and casing 12 is interposed the one-way clutch acting to permit reverse rotation of the planet carrier 24. The output shaft 21 is supported in casing 12 by bearing 58.

Pressure, preferably hydraulic, is maintained against piston 41 arriving through passages 42 and 43 from a suitable source 60 (conveniently, an oil pump of any well known form) through a pressure control valve 61 within the manual control of the operator.

The operation is as follows: Rotation of the input shaft 10, by reason of the eccentric 14, causes lateral reciprocation of the wobble plate 16 and the engagement of this plate with the rollers 28 causes reciprocation of the lever slide arms 27 and consequent oscillation of the lever sleeves 25. Each sleeve, during its maximum oscillation speed, acting through its one-way clutch 52 to rotate forwardly its gear 51 consequently rotates forwardly the pinion 22 of output shaft 21. When rollers 28 are more distantly positioned relative to the axis of their lever sleeves 25, wobble plate 16 will be able to exert its greatest leverage upon sleeves 25 but through the smallest arc of oscillation of said sleeves, the parts being therefore in low speed position. As the load torque decreases, the operator, by manipulation of the control valve 61 increases the hydraulic pressure against pistons 41 thereby driving plungers 37 toward the left (Fig. 1), rotating heads 31 so as to shift pins 30 to retract the lever arms 27 thereby decreasing their effective leverage but increasing their arcs of movement by the wobble plate 16 so that when maximum pressure is applied to the pistons 41, and the lever plates 27 are in their minimum leverage but maximum arc positions, the parts are in high speed relation.

Any desired ratio between gears 51 and 50 may be adopted but I prefer one which, when the lever slides 27 are in their high speed position, will tend to drive output shaft 21 by a speed greater than the speed of the input shaft so that, when this high speed relation is attained, the one-way clutch 22 will prevent overrunning of the output shaft and consequently the entire mechanism carried by the planet carrier 24 will rotate about the axis of the output shaft and the several lever sleeves 25 will cease to oscillate.

I claim as my invention:

1. In a speed-varying transmission unit, a variable-lever ratchet mechanism comprising a sleeve mounted for oscillation about its own axis and for revolution about an external axis parallel with its axis of oscillation and having a transverse lever-guide, a lever slidably mounted in said guide, an oscillable actuator journalled in said sleeve and connected to said lever to shift it in its guide, and means by which said actuator may be shifted.

2. In a speed-varying transmission unit, a variable-lever ratchet mechanism comprising a sleeve mounted for oscillation about its own axis and for revolution about an external axis parallel with its axis of oscillation and having a transverse lever-guide, a lever slidably mounted in said guide, an oscillable actuator journalled in said sleeve and connected to said lever to shift it in its guide, means by which said actuator may be shifted, an input eccentric having an axis laterally offset relative to said sleeve, and a wobble ring journalled on said eccentric and connected with said lever.

3. In a speed-varying transmission unit, a variable-lever ratchet mechanism comprising a sleeve mounted for oscillation about its own axis and for revolution about an external axis parallel with its axis of oscillation and having a transverse lever-guide, a lever slidably mounted in said guide and provided with a crosshead slot, an oscillable actuator journalled in said sleeve and having an eccentric wrist-pin projected into said crosshead slot, an axially-movable plunger mounted in said sleeve and associated with said actuator by an axially-slidable non-rotative connection, a helical slidable connection between said sleeve and plunger, and means by which said plunger may be axially shifted.

WILLIAM B. OSBORNE.

REFERENCES CITED

The following references are of record in the file of this patent:

UNITED STATES PATENTS

| Number | Name | Date |
|---|---|---|
| 1,943,396 | Quevrain et al. | Jan. 16, 1934 |
| 1,572,360 | Petersson | Feb. 9, 1926 |
| 2,142,976 | Seidel | Jan. 3, 1939 |
| 1,607,223 | Wilcox et al. | Nov. 16, 1926 |
| 2,174,780 | Dusevoir et al. | Oct. 3, 1939 |